United States Patent
Singh et al.

(10) Patent No.: US 11,144,730 B2
(45) Date of Patent: Oct. 12, 2021

(54) MODELING END TO END DIALOGUES USING INTENT ORIENTED DECODING

(71) Applicant: Sprinklr, Inc., New York, NY (US)

(72) Inventors: Anand Kumar Singh, Pune (IN); Nikhil Goel, Delhi (IN); Pavitar Singh, Haryana (IN); Shubham Sharma, Uttar Pradesh (IN); Vasant Srinivasan, Haryana (IN); Yoginkumar Patel, Gujarat (IN)

(73) Assignee: SPRINKLR, INC., New York, NY (US)

( * ) Notice: Subject to any disclaimer, the term of this patent is extended or adjusted under 35 U.S.C. 154(b) by 163 days.

(21) Appl. No.: 16/535,507

(22) Filed: Aug. 8, 2019

(65) Prior Publication Data

US 2021/0042388 A1 Feb. 11, 2021

(51) Int. Cl.
*G06F 40/35* (2020.01)
*G06F 40/56* (2020.01)

(52) U.S. Cl.
CPC .............. *G06F 40/35* (2020.01); *G06F 40/56* (2020.01)

(58) Field of Classification Search
CPC ................................ G06F 40/35; G06F 40/56
USPC .......................................................... 704/9
See application file for complete search history.

(56) References Cited

U.S. PATENT DOCUMENTS

| | | |
|---|---|---|
| 6,078,924 A | 6/2000 | Ainsbury |
| 7,720,835 B2 | 5/2010 | Ward |
| 7,877,345 B2 | 1/2011 | Nigram |
| 9,105,036 B2 | 8/2015 | Mass |
| 10,140,646 B2 | 11/2018 | Parveen |
| 10,229,090 B2 | 3/2019 | Mosley |
| 10,509,863 B1 | 12/2019 | Arfa |
| 10,685,183 B1 | 6/2020 | Arfa |
| 11,049,133 B1 | 6/2021 | Huang |
| 2003/0236834 A1 | 12/2003 | Gottfried |
| 2004/0059736 A1 | 3/2004 | Willse |
| 2006/0129446 A1 | 6/2006 | Ruhl |
| 2007/0244888 A1 | 10/2007 | Chea |

(Continued)

FOREIGN PATENT DOCUMENTS

WO WO 2017/062884 A1 4/2017

OTHER PUBLICATIONS

Dong-Guk Shin, "An expectation-driven response understanding paradigm," in IEEE Transactions on Knowledge and Data Engineering, vol. 6, No. 3, pp. 430-443, Jun. 1994, doi: 10.1109/69.334859. (Year: 1994).*

(Continued)

*Primary Examiner* — Bharatkumar S Shah
(74) *Attorney, Agent, or Firm* — Schwabe Williamson & Wyatt

(57) ABSTRACT

A dialogue intent analyzer uses a conversation between a user and agent, and intents in the conversation to predict a set of answers that better respond to pending user question. The dialogue intent analyzer understands the context surrounding the pending question by capturing and modeling prior conversation and intents within the conversation. Dialogue intent analyzer also reduces genericness in predicted answers by weighting previously used answers based on their frequency and length. Dialogue intent analyzer also increases diversity of predicted answers by using a diverse beam search.

15 Claims, 11 Drawing Sheets

(56) References Cited

U.S. PATENT DOCUMENTS

| | | |
|---|---|---|
| 2007/0294281 A1 | 12/2007 | Ward |
| 2008/0133488 A1 | 6/2008 | Bandaru |
| 2008/0154883 A1 | 6/2008 | Chowdhury |
| 2009/0164417 A1 | 6/2009 | Nigam |
| 2009/0282019 A1 | 11/2009 | Galitsky |
| 2009/0319342 A1 | 12/2009 | Shilman |
| 2010/0094878 A1 | 4/2010 | Soroca |
| 2010/0262454 A1 | 10/2010 | Sommer |
| 2011/0145064 A1 | 6/2011 | Anderson |
| 2011/0258049 A1 | 10/2011 | Ramer |
| 2012/0179752 A1 | 7/2012 | Mosley |
| 2013/0290142 A1 | 10/2013 | Croes |
| 2013/0304581 A1 | 11/2013 | Soroca |
| 2015/0066803 A1 | 3/2015 | Aneja |
| 2015/0262313 A1* | 9/2015 | Shah .................. G06Q 30/0203 |
| | | 705/7.32 |
| 2016/0063093 A1 | 3/2016 | Boucher |
| 2016/0117737 A1 | 4/2016 | Sinha |
| 2016/0179959 A1 | 6/2016 | Mosley |
| 2016/0189165 A1 | 6/2016 | Vivlamore |
| 2016/0267377 A1 | 9/2016 | Pan |
| 2017/0068648 A1 | 3/2017 | Parveen |
| 2019/0043075 A1 | 2/2019 | Peysakhovich |
| 2019/0115008 A1* | 4/2019 | Jiang ...................... G10L 15/22 |
| 2019/0317994 A1* | 10/2019 | Singh ...................... G06F 40/30 |
| 2019/0325626 A1 | 10/2019 | Tao |
| 2020/0004825 A1* | 1/2020 | Pasternack ............. G06Q 50/01 |
| 2020/0167417 A1* | 5/2020 | Li ........................... G06F 40/169 |

OTHER PUBLICATIONS

Dong-Guk Shin, "An expectation-driven response understanding paradigm," in IEEE Transactions on Knowledge and Data Engineering, vol. 6, No. 3, pp. 430-443, Jun. 1994, doi: 10.1109/69.334859. (Year: 1994) (Year: 1994).*

Redmon, et al., "YOLOv3: Ari Incremental Improvement", Dec. 23, 2018, University of Washington; URL: https://web.archive.org/web/20181223120043/https://pjreddie.com/media/files/papers/YOLOv3.pdf>; 6 pages.

Szegedy et al., "Rethinking the Inception Architecture for Computer Vision", Cornell University, Dec. 11, 2015 URL: https://arxiv.org/abs/1512.00567; 10 pages.

Wikipedia "Dependency Grammar", Dec. 28, 2018, URL: https://web.archive.org/web/20181228023401/https://en.wikipedia.org/wiki/Dependency_grammar; 8 pages.

Wikipedia "Big Five Personality Trains", Dec. 28, 2018; URL: https://web.archive.org/web/20181228053946/https://en.wikipedia.org/wiki/Big_Five_personality_traits>; 39 pages.

Wikipedia "Named-entity Recognition", Dec. 28, 2018; URL: https://web.archive.org/web/20181228221205/https://en.wikipedia.org/wiki/Named-entity_recognition; 6 pages.

* cited by examiner

Question intents — 156
- Billing
- Service Outage
- Internet/Data Service
- Device Performance
- Customer Service/Chat Quality
- Request Contact
- Offers & Promotions
- Package/Plans
- Closing Statements
- Intent/Churn
- Account (~40 more)

Answer intents — 158
- (Generic) Issue resolution
- (Generic) Assistance
- Happy to help
- More Information
- Status Updates
- Customer churn
- Directing to a link
- Reward
- Wait time
- Private Message
- Waiting for response (~30 more)

FIG. 6

107A — hi , i'd like to look into the matter on priority. please inbox us with your respective airtel number. <agent> (high in frequency, 0.138) — 164A 107B — hi <name> ! we tried reaching out for telephonic conversation but couldn't connect. please let us know the convenient time to connect and discuss. thank you , <agent> (low in frequency, 1.0) — 164B

FIG. 10

MODELING END TO END DIALOGUES USING INTENT ORIENTED DECODING

BACKGROUND

Support centers respond to user issues. For example, a user may click a help window on a company website to discuss a particular problem regarding a product or service with a company agent. The user and the agent conduct an online dialogue to hopefully resolve the issue.

An automated response system may help the agent respond to user questions. The response system may use machine learning models to suggest a response to the user questions. For example, a user may post a question regarding a particular product. The automated response system may display different possible responses to the user question. The agent can then select and/or modify any of the proposed responses for sending back to the user.

Several problems exist with automated response systems. The machine learning models have limited trainable parameters and produce the same generic answers to a wide variety of different questions. The different suggested answers to a question also may have little diversity. For example, all of the suggested answers may be substantially the same leaving the agent with few options for responding to the user question. Learning models also may not understand the context of ongoing dialogs between the user and the agent and therefore inaccurately respond to questions.

BRIEF DESCRIPTION OF THE DRAWINGS

FIG. 6 shows example question intents and answer intents used for a telecommunications application.

FIG. 10 shows how answers are weighted based on frequency and length.

DETAILED DESCRIPTION

Figure 1:
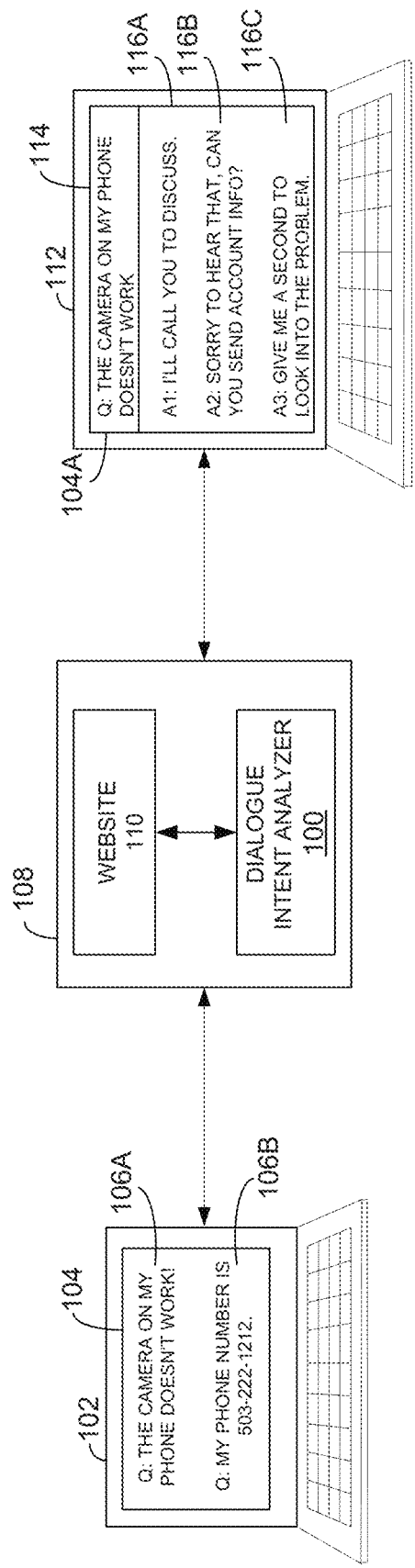
FIG. 1 shows an example dialogue intent analyzer.

FIG. 1 shows a dialogue intent analyzer 100 that predicts answers to user questions. Intent analyzer 100 may operate on any computing device 108, such as a server system, personal computer, laptop computer, smart phone, or tablet, etc. In one example, a user may use a computing device 102 to access a webpage 104 on a website 110 operated by a company. In this example, the company may sell smart phones. But, intent analyzer 100 may be used with any company or any entity that sells or provides any product or service where a user needs help.

The user may access website 110 via an Internet connection to initiate an online direct messaging (DM) or instant messaging (IM) session with an agent operating a computer device 112. The agent may be employed by the company operating website 110 to answer online questions posted by users. The user may post questions 106A and 106B in a window displayed on webpage 104. Website 110 sends questions 106 to a webpage 114 displayed on agent computing device 112.

Website 110 also forwards questions 106 to dialogue intent analyzer 100. Intent analyzer 100 predicts one or more answers 116A-116C to questions 106. The agent operating computer device 112 can then select any of answers 116A-116C for responding to the latest pending question 106B posted by the user. Intent analyzer 100 generates answers 116 that are less generic, more diverse, and more accurately relate to the context of the online dialogue between the user and agent.

Less generic answers 116 are more unique for a particular question 106. In other words, instead of generating the same generic answer 116 for a variety of different questions 106, intent analyzer 100 predicts more unique customized answers 116 to each question 106. This increases the likelihood predicted answers 116 are more responsive and relevant for a particular question 106.

More diverse answers 116 provide a wider variety of different predicted answers 116A-116C for a particular question 106. For example, instead of providing three substantially identical answers 116A, 116B, and 116C to a particular question 106, intent analyzer 100 predicts a more diverse range of answers 116A-116C to that question 106. This increases the likelihood one of predicted answers 116A-116C satisfactorily responds to a current pending question 106B.

Context based answers 116 more accurately take into account the context of the dialogue between the user and agent. For example, instead of just analyzing the last pending question 106B, intent analyzer 100 takes into account the previous conversation of questions 106 and answers 116. Intent analyzer 100 uses the previous conversation to determine the context behind a pending question 106B and predict more relevant answers 116A-116C.

Intent analyzer 100 identifies intents in questions 106, answers 116, and in the entire dialogue between the user and agent. Intent analyzer 100 uses the intents to more efficiently and accurately determine the context of the dialogue and predict more relevant answers 116 to questions 106.

Figure 2:
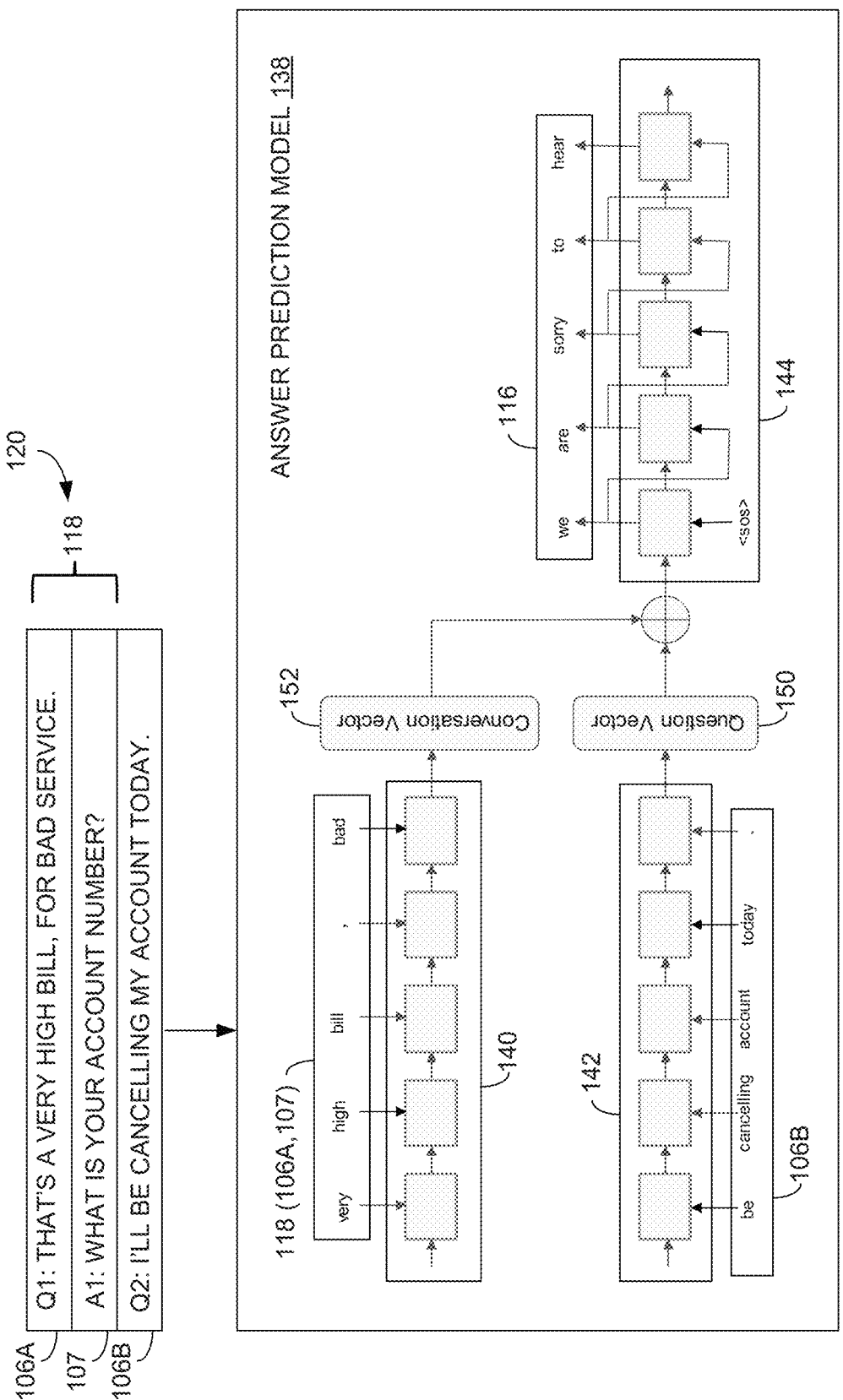
FIG. 2 shows an example answer prediction model used in the intent analyzer of FIG. 1.

FIG. 2 shows one example of how intent analyzer 100 identifies the context in a dialogue 120 to predict more relevant answers 116 to questions 106. As stated above, natural language processors may train an encoder and decoder to predict an answer to a single question. The single question may not provide any context to the previous dialogue 120 between the user and agent.

In one example, answer prediction model 138 uses a Seq2Seq natural language processing model that includes a conversation encoder 140, a question encoder 142, and a predicted answer decoder 144. Question encoder 142 generates a question vector 150 from a current pending question 106B from dialogue 120. Conversation encoder 140 may generate a conversation vector 152 from the series of questions 106A and answers 107 in dialogue 120 prior to pending question 106B referred to as conversation 118.

Decoder 144 predicts an answer 116 based on both current pending question 106B and prior conversation 118. Answer prediction model 138 uses the previous conversation 118 in dialogue 120 to determine the context surrounding current user question 106B to predict a more relevant answer 116. For example, conversation vector 152 can identify the reason why the user is cancelling their account in question 106B. In one example, a sliding window is used to identify a prior group of one-three questions 106 and one-three answers 107 for conversation 118. Of course, any number of questions and answers may be included in conversation 118.

Figure 3:
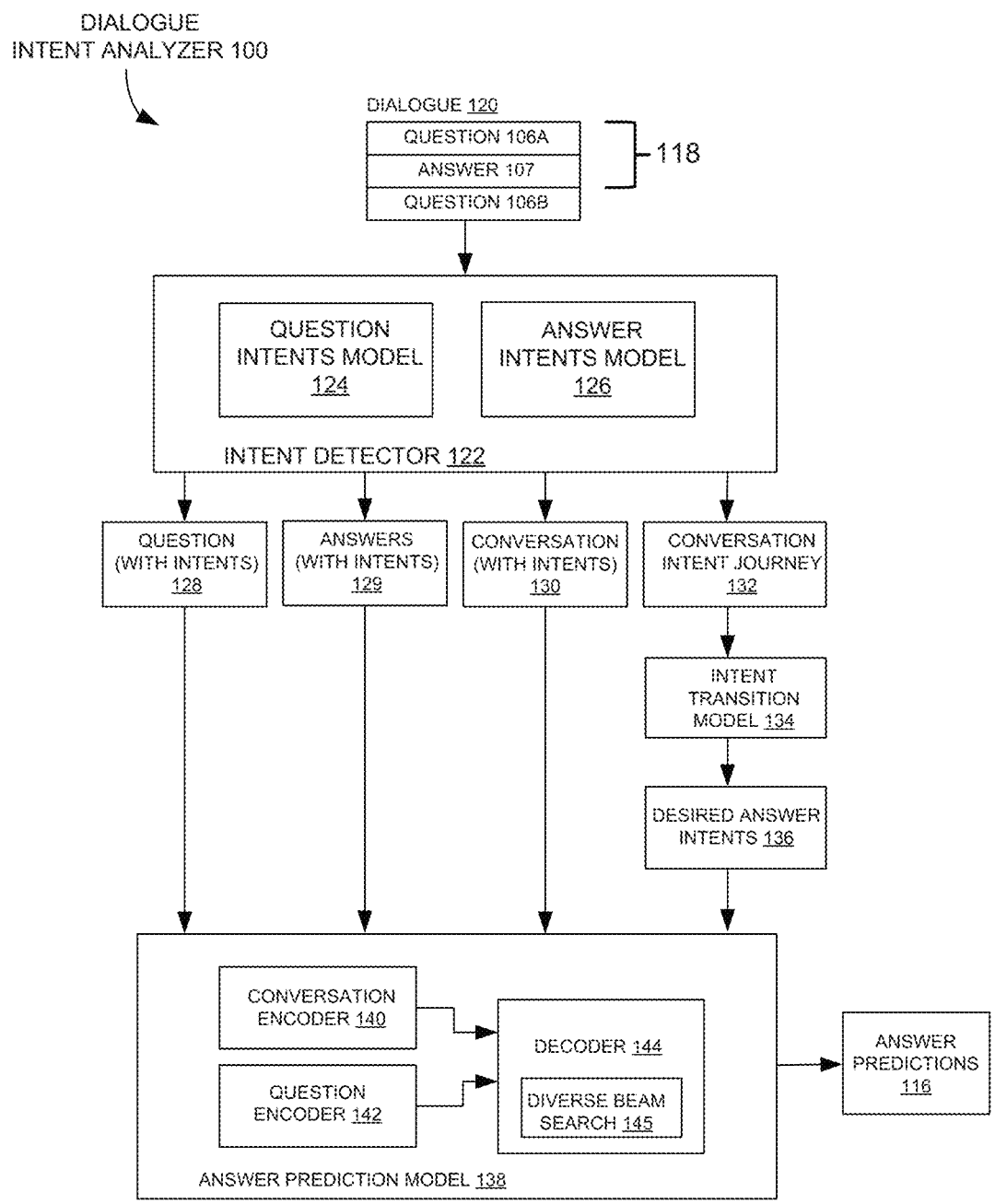
FIG. 3 shows the dialogue intent analyzer of FIG. 1 in more detail.

FIG. 3 shows additional features used in dialogue intent analyzer 100. Dialogue 120 includes a series of questions 106 and answers 107 that are input into an intent detector 122. A question intents model 124 in intent detection system 122 identifies intents in questions 106 posted by the user. An answer intents model 126 in intent detection system 122 identifies intents in answers 107 posted by the agent to the user.

A current pending question 106B with identified intents are combined into question with intents 128. Answers 107 and their intents are combined into answers with intents 129. Intent detection system 122 combines the conversation 118 in dialogue 120 with the intents identified by models 124 and model 126 into conversations with intents 130.

Intent detector 122 combines the intents from conversation 118 together to form a conversation intent journey 132. Conversation intent journey 132 is fed into an intent transition model 134 that identifies desired answer intents 136.

Answer prediction model 138, similar to the one in FIG. 2, uses dialog 120 with the identified intents to generate different answer predictions 116 for current pending question 106B. Current pending question 106B with intents 128 is input into questions encoder 142. Conversation with intents 130 is input into conversation encoder 140. Answers with intents 129 is input into decoder 144 during model training. Desired answers with intents 136 is used by decoder 144 during normal operation.

Answer prediction model 138 uses the conversation 118 between the user and agent, and the identified intents, to predict answers 116 that better respond to pending user question 106B. Dialogue intent analyzer 100 also reduces genericness in predicted answers 116 by weighting previously used answers 107 based on their frequency and length. Dialogue intent analyzer 100 also increases diversity of predicted answers 116 by using a diverse beam search 145. These features are described in more detail below.

Figure 4:
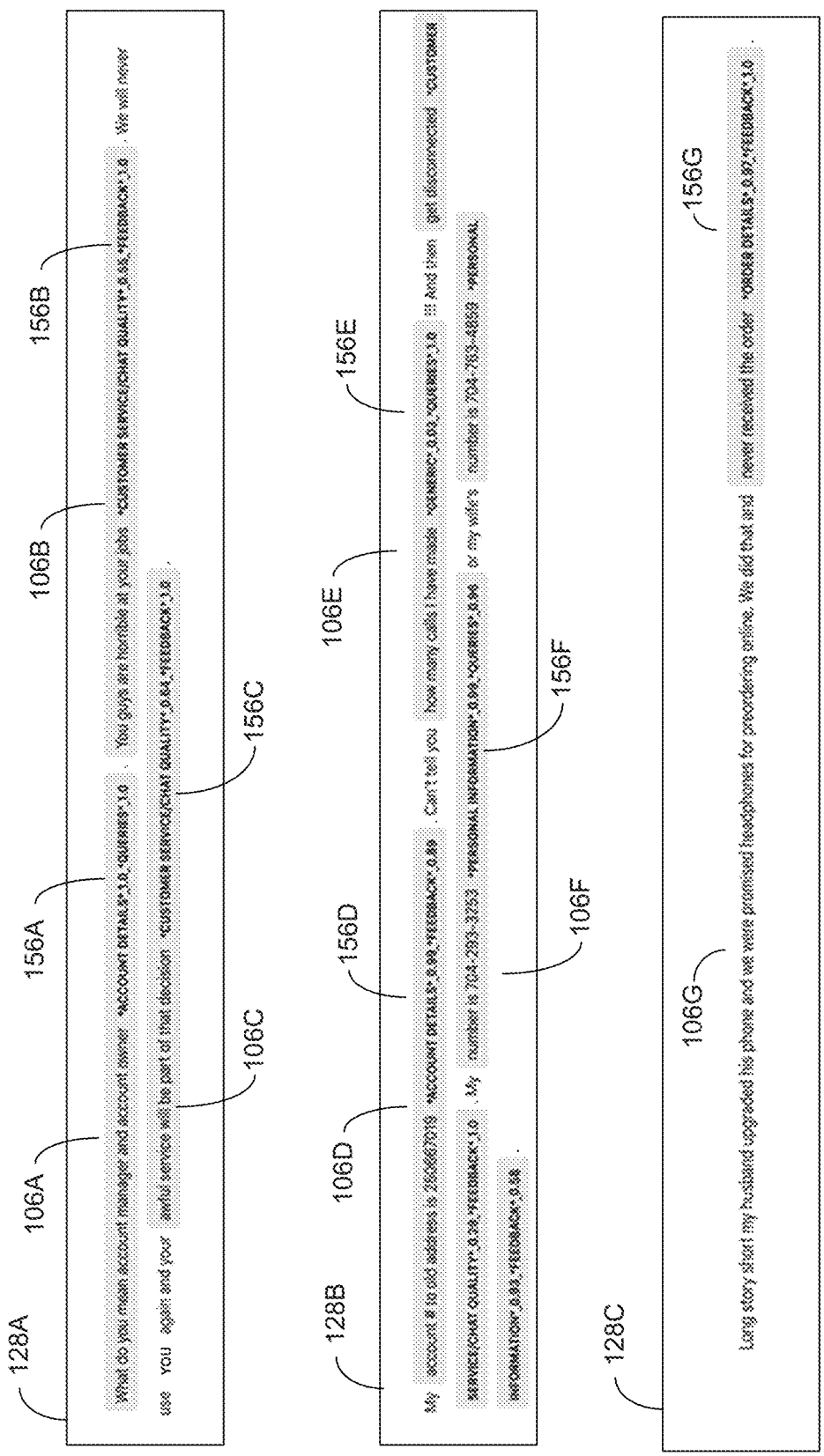
FIG. 4 shows questions with intents identified by the dialogue analyzer.

FIG. 4 shows different groups of questions with question intents 128A-128C generated by question intents model 124 in FIG. 3. A first question 106A asks about an account manager and account owner. Question intents model 124 assigns an intent 156A to question 106A, such as an account details query. A second question 106B may indicate user dissatisfaction with the customer support service. Question intent model 124 assigns a customer service/chat quality feedback intent 156B to question 106B. A third question 106C may also indicate user dissatisfaction with the customer support service. Question intent model 124 assigns another customer service/chat quality feedback intent 156C to question 106C.

Question 106D provides account information and is assigned an account details feedback intent 156D. Question 106E is a general comment and is assigned a generic queries intent 156E. Question 106F provides a phone number and is assigned a personal information query intent 156F by question intents model 124. Question 106G discusses an order and is assigned an order details feedback intent 156G by question intents model 124.

Figure 5:
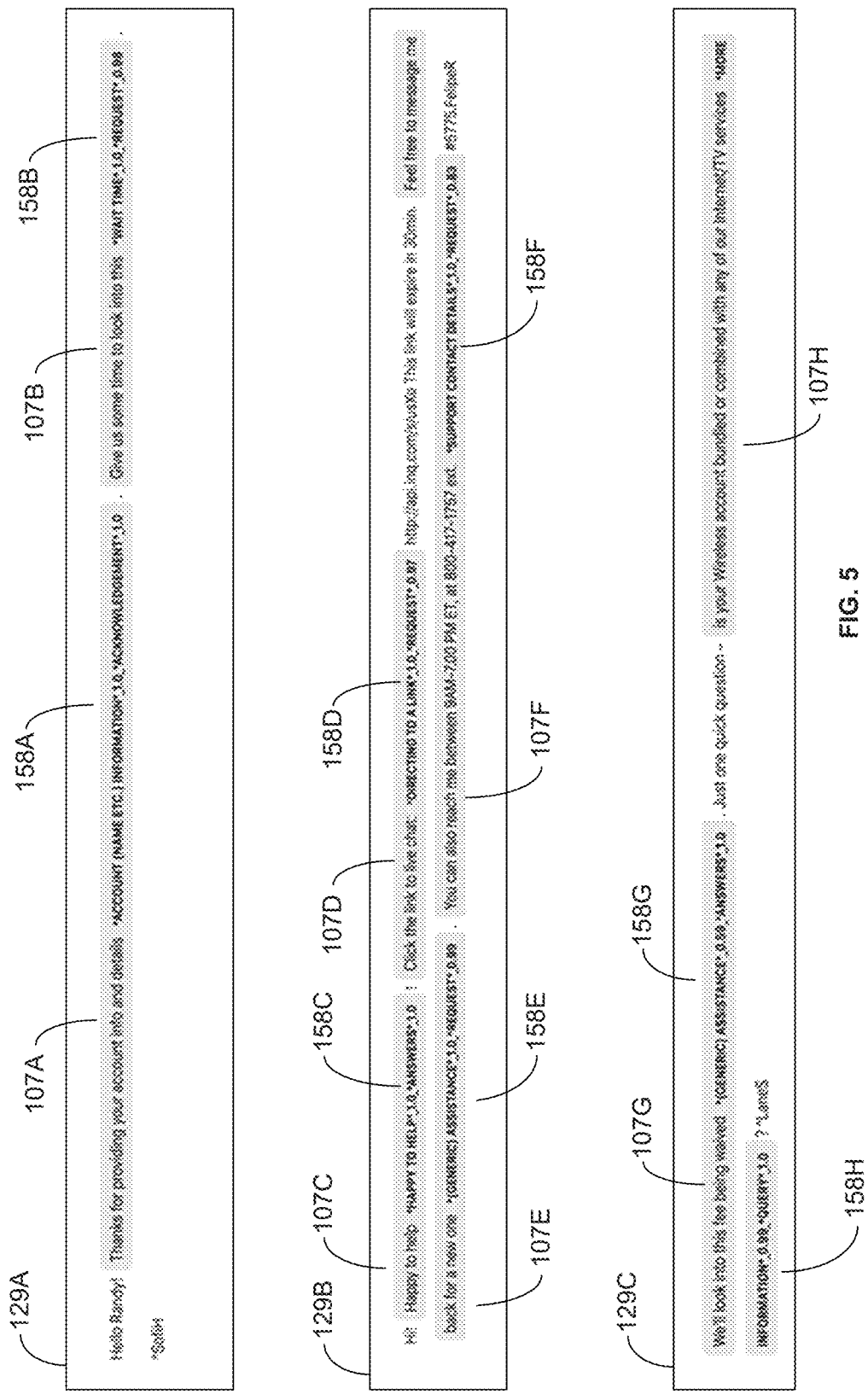
FIG. 5 shows answers with intents identified by the dialogue analyzer.

FIG. 5 shows three different groups of answers with intents 129A-129C generated by answer intents model 126 in FIG. 3. A first answer 107A acknowledges receipt of account information. Answer intents model 126 assigns intent 158A to answer 107A, such as an information acknowledgement. A second answer 107B may request time to look into a user question. Answer intents model 126 assigns a wait time request intent 158B to answer 107B.

Answer 107C positively acknowledges helping a user and is therefore assigned a happy to help answer intent 158D. Answer 107D directs a user to click a link and is assigned a directing to a link request intent 158D. Answer 107E notifies a user to contact the agent for further assistance and is assigned a generic assistance request intent 158E by answer intents model 126. Answer 107F provides information for contacting the agent and is assigned a support contact details request intent 158F by answer intents model 126.

An answer 107G indicates the agent will look into waiving a fee and an answer 107H inquires about a user account. Answer intents model 126 assigns answer 107G a generic assistance answers intent 158G and assigns answer 107H a more information query intent 158H.

As explained above, a current pending question 106 embedded with question intents 156 is input into questions encoder 142 as question with intents 128. The series of previous questions 106 with embedded question intents 156 and associated answers 107 with embedded answer intents 158 are input into conversation encoder 140 in FIG. 3 as conversation with intents 130. During training, answers 107 with embedded answer intents 158 are input into decoder 144 as answers with intents 129. The intents from an entire dialogue 120 may be used for training intent transition model 134. During operation, intent transition model 134 may use the intents 156 and 158 from conversation with intents 130 as conversation intent journey 132.

FIG. 6 shows sets of question intents 156 and answer intents 158 used for a specific industry, such as the telecommunications industry. This of course is just one example set of question intents 156 and answer intents 158.

Intents 156 and 158 classify different phrases within questions 106 and answers 107, respectively. Some intent categories may relate to responses to previous questions 106. Intents 156 and 158 may be manually assigned to captured dialogues 118 between users and agents. The captured dialogues 120 and manually assigned intents 156 and 158 are then used to train question intents model 124 and answer intents model 126.

Intents 156 and 158 identify categories for phrases and location of the categories in questions 106 and answers 107. The structure of these transitions between user question intents 156 and agent answer intents 158 are analyzed by intent transition model 134.

Figure 7:
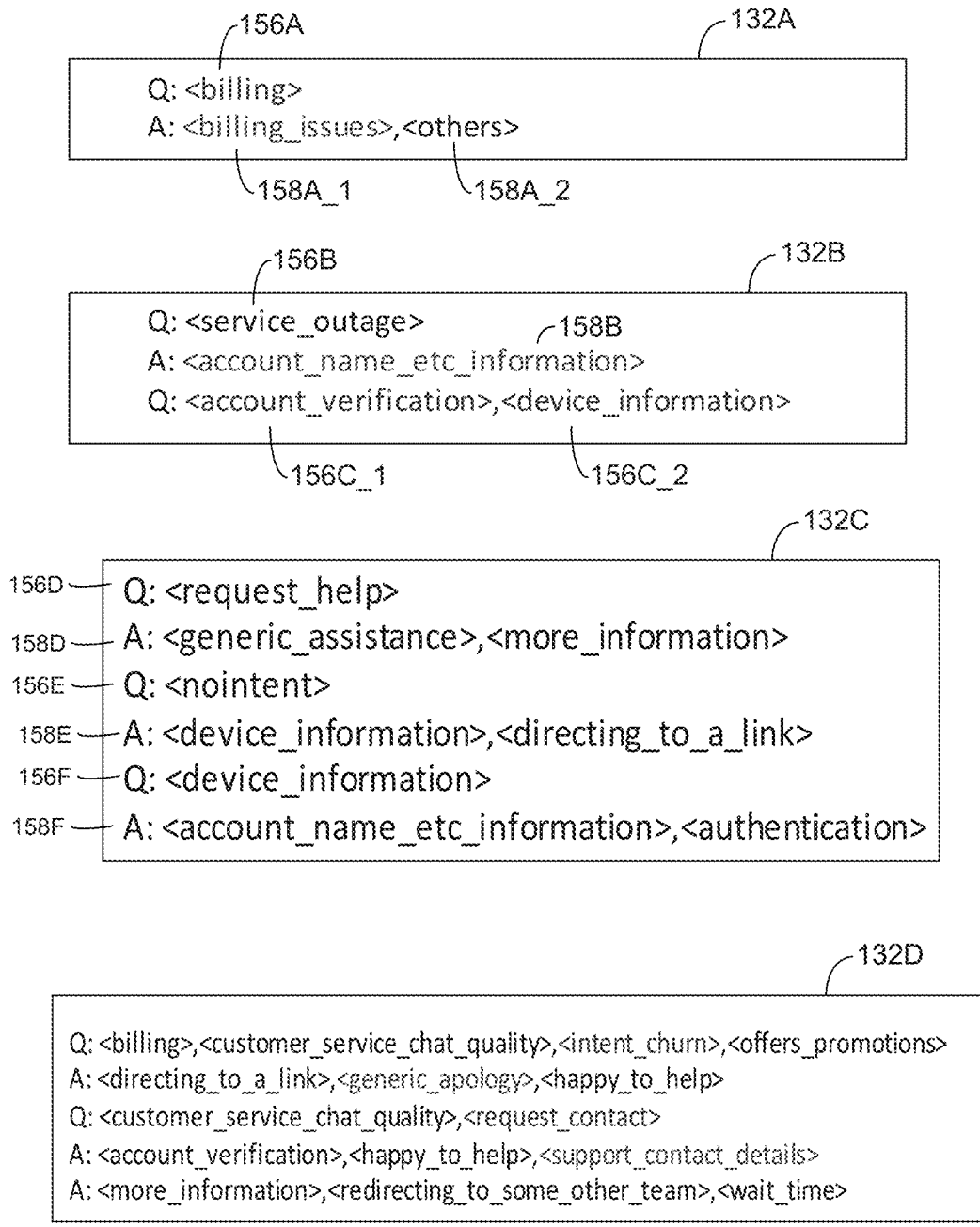
FIG. 7 shows conversation intent journeys identified by the dialogue analyzer.

FIG. 7 shows different conversation intent journeys 132A-132D identified by intent detector 122 in FIG. 3. Conversation intent journeys 132 each include a series of intents 156 and 158 identified on a sentence level. For example, a first conversation intent journey 132A may include a question intent 156A and two answer intents 158A_1 and 158A 2. A second conversation intent journey 132B may include a question intent 156B, answer intent 158B, and two question intents 156C_1 and 156C_2.

Conversation intent journeys 132 show transitions between question intents 156 and answer intents 158 and identify how agents respond with answers 116 to user questions 106 and how users respond with questions 106 to agent answers 116. These question-answer transitions 132 are used by intent transition model 134 in FIG. 3 to predict desired answers intents 158.

Figure 8:
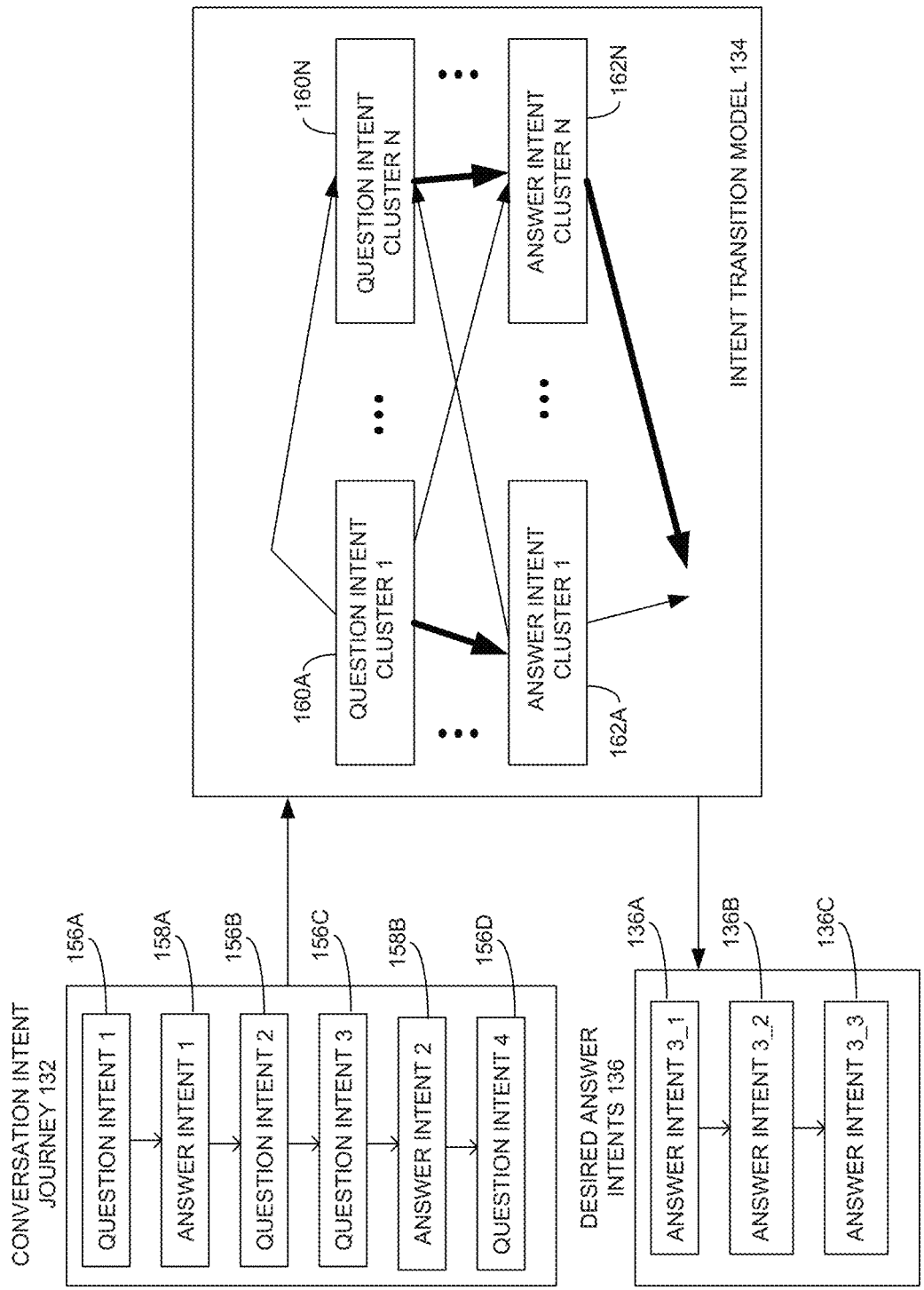
FIG. 8 shows an example, intent transition model used by the dialogue analyzer.

FIG. 8 shows in more detail intent transition model 134. A conversation intent journey 132 include a series of question intents 156 and answer intents 158. Intent transition model 134 identifies different question intent clusters 160 and answer intent clusters 162 in conversation intent journey 132. For example, intent transition model 134 may identify answer intent cluster 162A based on the transitions of question and answer intents 156A, 158B, 156B, 156C, 158B, and 156D. The three most popular answer intents 136A-136C in answer intent cluster 162A are output by intent transition model 134.

Model Training

Referring back to FIG. 3, a set of training data is used to train question intents model 124 and answer intents model 126. As mentioned above, an operator may manually identify question intents 156 and answer intents 158 in previously captured dialogues 120. These captured dialogues 120 may be associated with a particular industry. The questions 106 with manually labeled question intents 156 are used to train question intents model 124 and the answers 116 with manually labeled answer intents 158 are used to train answer intents model 126.

A current pending question with intents 128 from the training data is fed into questions encoder 142 and conversation with intents 130 is fed into conversation encoder 140. The answer with intents 129 to pending question with intents 128 is fed into decoder 144.

The following example shows in more detail how dialogue intent analyzer 100 is trained. Referring still to FIG. 3, a dialogue 120 may include the following questions and answers:

Question 1: Hey, I have an issue with my mobile bill?
Answer 1: Hi Customer, sorry to hear about the issue you are facing. Could you share your mobile number so we can get started?
Question 2: It's 8178187745
Answer 2: Thanks for providing the info. Please allow us some time as we look into your billing issue.

The following questions with intents 128 and answers with intents 129 are used for training intent detector 122.

| Question 1: | Hey, I have an <billing> issue with my mobile bill? </billing> |
| Answer 1: | Hi Customer, <apology> sorry to hear about the issue </apology> you are facing. Could you share <account_name_etc_information> your mobile number </account_name_etc_information> so we can get started? |
| Question 2: | It's <personal_information> 8178187745 </personal_information> |
| Answer 2: | <acknowlegement> Thanks for providing the info </acknowlegement>. Please <wait_time> allow us some time </wait_time> as we look into your <billing_issues> billing issue </billing_issues>. |

Intent detector 122 combines question 1 with intents and answer 1 with intents together to form conversation with intents 130. Question 2 with intents 128 is input into question encoder 142, conversation with intents 130 is input into conversation encoder 140, and answer 2 with intents 129 is input into decoder 144.

Intent detector 122 inputs the following conversation intent journey 132 into intent transition model 134.

<billing>
<apology><account_name_etc_information>
<personal_information>
<acknowlegement><wait_time><billing_issues>

The following conversation with intents 130 is used for training conversation encoder 140.

hey, i have an <billing> issue with my mobile bill? </billing> <next>
hi customer, <apology> sorry to hear about the issue </apology> you are facing. could you share <account_name_etc_information> your mobile number </account_name_etc_information> so we can get started?

The following question with intents 128 is used for training questions encoder 142.

it's <personal_information> 8178187745 </personal_information>.

The following answer with intents 129 is used for training decoder 144.

<acknowlegement> <wait_time> <billing_issues> thanks for providing the info. please allow us some time as we look into your billing issue.

Operation

After being trained, dialogue intent analyzer 100 receives real-time user/agent dialogs 120. Intent detector 122 generates question with intents 128 and conversation with intents 130 as explained above for the current dialogue 120.

Figure 9:
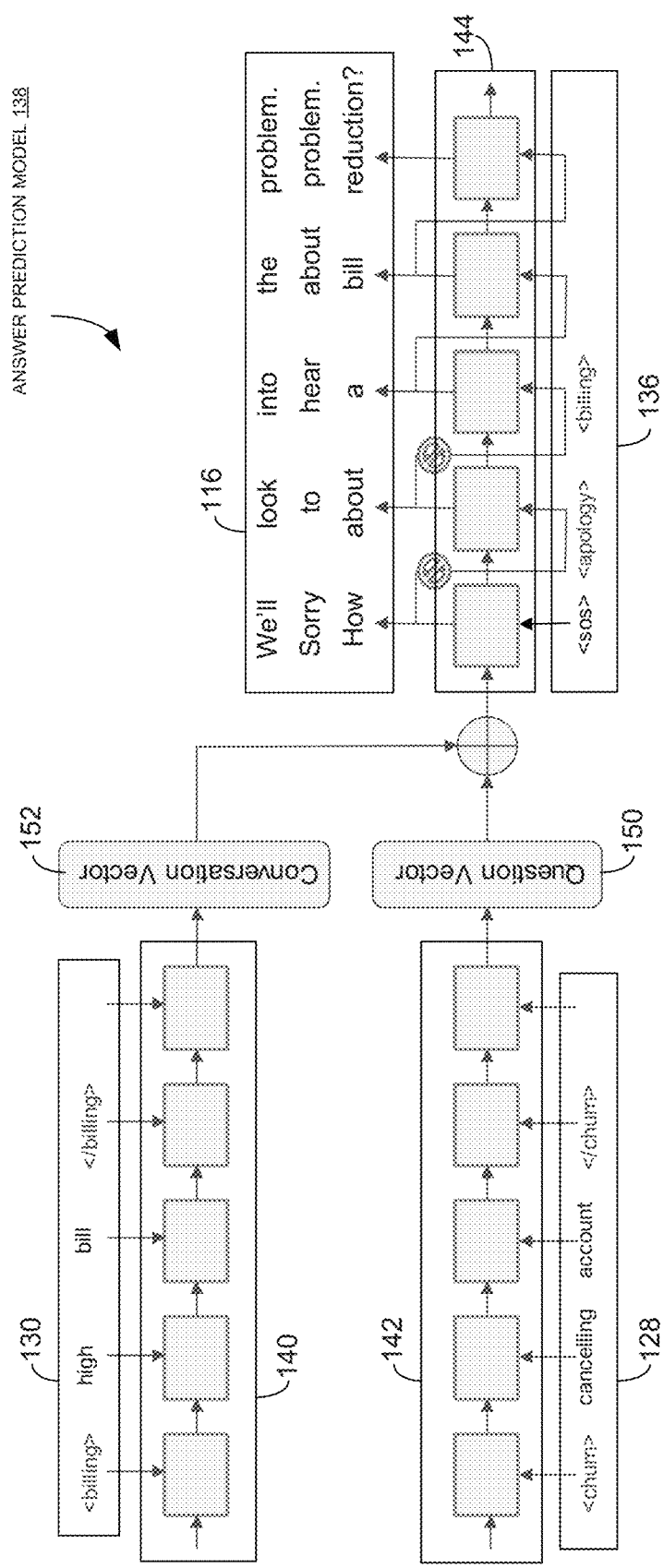
FIG. 9 shows another answer prediction model that uses desired answer intents generated by the intent transition model in FIG. 8.

Referring to FIGS. 3 and 9, a current pending question with intents 128 is input into questions encoder 142 and the conversation with intents 130 is input into conversation encoder 140. There is no current answer to current pending question with intents 128, so answer prediction model 138 does not receive answer with intents 129 as described above for the training phase.

Intent detector 122 uses the intents in conversation with intents 130 as intent journey 132. Intent transition model 134 predicts a set of desired answer intents 136 based on conversation intent journey 132. Decoder 144 uses desired answer intents 136 as seed values to fix the initial sequence of answer predictions 116.

Answer prediction model 136 generates non-generic and diverse answer predictions 116 based on question with intents 128, conversation with intents 130, and desired answer intents 136. Answer predictions 116 are then displayed on agent computer device 112 in FIG. 1. The agent can then select any of answer predictions 116 for responding to current pending user question 106.

FIG. 10 shows one technique for reducing the genericness of predicted answers 116. In one example, answers 107 used for training intent transition model 134 and/or answer prediction model 138 are weighted. For example, answers 107A most frequently selected by agents are typically used for training natural language learning models. However, the most frequently used answers 107A may be similar and cause machine learning models to generate relatively generic answers to user questions.

To reduce genericness, answers 107 are weighted. For example, the most frequently used answers 107A for particular user questions may be assigned lower weights 164A and less frequently used answers 107B to user questions may be assigned larger weights 164B. Similarly, shorter answers 107A, such as "thank you" also may be assigned lower weights 164A and longer more detailed answers 107B may be assigned higher weights 164B. The weighted answers 107A and 107B are then used for training intent transition model 134 and answer prediction model 138.

Decoder 144 may use a diverse beam search 145 to increase answer diversity. Decoder 144 performs diverse beam search 145 on desired answer intents 136. In one example, intent transition model 134 may generate a set of three desired answer intents 136 for a current pending question in a dialogue 120. Decoder 144 performs a diverse beam search simultaneously on the three desired answers intents 136 generated by intent transition model 134. Diverse answers intents 136 selected from the diverse beam search are then used as the seed values in decoder 144 as shown above in FIG. 9.

Hardware and Software

Figure 11:
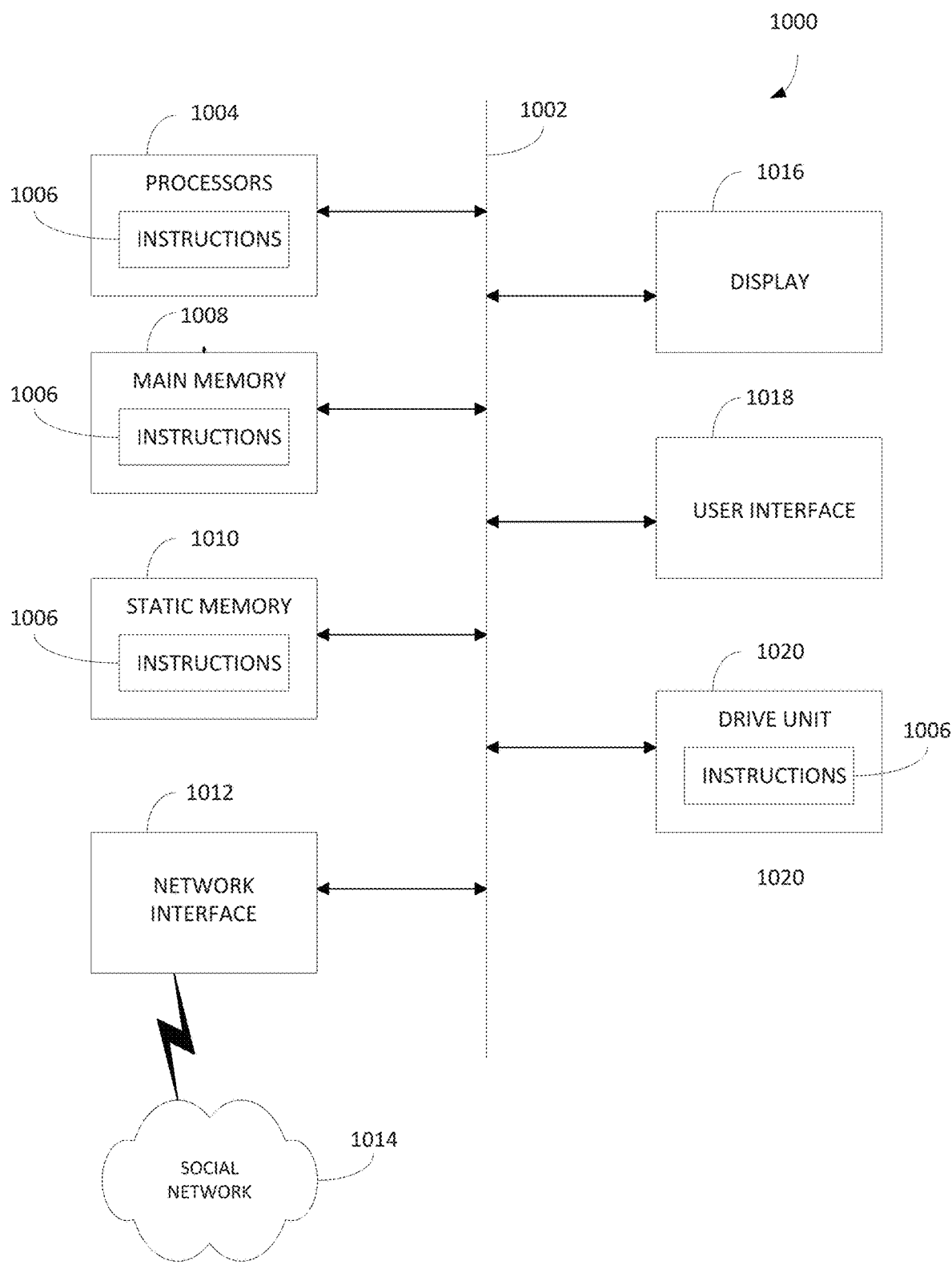
FIG. 11 depicts an example computer system for implementing the dialogue analyzer.

FIG. 11 shows a computing device 1000 that may be used for operating the dialogue intent analyzer 100 and performing any combination of operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the same corresponding time period.

The invention claimed is:

1. A computer architecture operating on a hardware computing device and configured to predict answers to questions, the computer architecture comprising:
   an intent detector configured to:
      receive a dialogue of questions and answers,
      identify intents in the questions and answers,
      identify one of the questions as a pending question, and
      identify a series of questions and answers preceding the pending question as a conversation;
   an intent transition model configured to generate desired answer intents from the intents;
   an answer prediction model configured to generate answer predictions based on the pending question with intents, the conversation with intents, and the desired answer intents;
   a question encoder in the answer prediction model configured to generate a question vector based on the pending question with intents;
   a conversation encoder configured to generate a conversation vector based on the conversation with intents; and
   a decoder configured to generate the answer predictions based on the question vector, the conversation vector, and the desired answer intents.

2. A computer architecture operating on a hardware computing device and configured to predict answers to questions, the computer architecture comprising:
   an intent detector configured to:
      receive a dialogue of questions and answers,
      identify intents in the questions and answers,
      identify one of the questions as a pending question, and
      identify a series of questions and answers preceding the pending question as a conversation;
   an intent transition model configured to generate desired answer intents from the intents;
   an answer prediction model configured to generate answer predictions based on the pending question with intents, the conversation with intents, and the desired answer intents;
   wherein the intent decoder is configured to perform a diverse beam search on the desired answer intents and use results of the diverse beam search to generate the answer predictions.

3. A computer program stored on a non-transitory storage medium, the computer program comprising a set of instructions that, when executed by a hardware processor, cause the hardware processor to:
   operate an answer prediction model;
   capture a dialog that includes a series of questions and answers;
   input a pending question in the dialog into the answer prediction model;
   input a conversation of questions and answers prior to the pending question into the answer prediction model to capture a context for the pending question; and
   use the answer prediction model to generate answer predictions for the pending question;
   wherein the instructions, when executed by the hardware processor, operate an intent detector configured to:
      identify intents in the pending question;
      identify intents in the questions and answers in the conversation;
      input the pending question with intents into the answer prediction model;
      input the conversation with intents into the answer prediction model; and
      use the question with intents and the conversation with intents to generate the answer predictions;
   wherein the instructions, when executed by the hardware processor, are further configured to:
      operate an intent transition model;
      combine intents in the dialogue into a conversation intent journey;
      inset the conversation intent journey into the intent transition model to generate desired answer intents;
      input the desire answer intents into the answer prediction model to generate the answer predictions;
   wherein the instructions, when executed by the hardware processor, are further configured to:
      input the pending question with intents into a question encoder in the answer prediction model;
      input the conversation with intents into a conversation encoder in the answer prediction model; and
      input the desired answer intents into a decoder in the answer prediction model.

4. The computer program of claim 3, wherein the instructions, when executed by the hardware processor, are further configured to:
   input a question vector generated by the question encoder into the decoder; and
   input a conversation vector generated by the conversation encoder into the decoder.

5. The computer program of claim 3, wherein the instructions, when executed by the hardware processor, are further configured to:
   perform a diverse beam search on the desired answer intents; and
   use results of the diverse beam search as seed values in the decoder to increase diversity of the answer predictions.

6. The computer program of claim 3, wherein the instructions, when executed by the hardware processor, are further configured to:
   store a set of questions and answers from prior dialogues to train the answer prediction model; and
   assign lower weights to the most frequently used answers in the prior dialogues and higher weights to the less frequently used answers in the prior dialogues to reduce genericness of the answer predictions.

7. The computer program of claim 6, wherein the instructions, when executed by the hardware processor, are further configured to:
   assign lower weights to shorter answers in the prior dialogues and higher weights to longer answers in the prior dialogues to further reduce a genericness of the answer predictions.

8. The computer program of claim 3, wherein the answer prediction model uses a Seq2Seq encoder-decoder.

9. A processing system for operating a dialogue analyzer, the processing system comprising:
   a processing device configured to:
      operate an intent detector;
      operate an answer prediction model;
      capture a dialogue of user questions and agent answers to the user questions;
      use the intent detector to identify question intents in the user questions and answer intents in the agent answers;
      identify a pending question in the dialogue;
      use the intent detector to add intents to the pending question;
      input the pending question with intents into the answer prediction model;

identify a sequence of questions and answers prior to the pending question as a conversation;
use the intent detector to add intents to the questions and answers;
input the conversation with intents into the answer prediction model;
use the answer prediction model to generate answer predictions for the pending question based on the question with intents and the conversation with intents;
input the pending question with intents into a question encoder in the answer prediction model;
input the conversation with intents into a conversation encoder in the answer prediction model; and
input the answer intents into a decoder in the answer prediction model;
wherein the question encoder generates a question vector and inputs the question vector into the decoder and the conversation encoder generates a conversation vector and inputs the conversation vector into the decoder.

10. The processing system of claim 9, wherein the intents added to the questions are categories for phrases in the questions and the intents added to the answers are categories for phrases in the answers.

11. A processing system for operating a dialogue analyzer, the processing system comprising:
a processing device configured to:
operate an intent detector;
operate an answer prediction model;
capture a dialogue of user questions and agent answers to the user questions;
use the intent detector to identify question intents in the user questions and answer intents in the agent answers;
identify a pending question in the dialogue;
use the intent detector to add intents to the pending question;
input the pending question with intents into the answer prediction model;
identify a sequence of questions and answers prior to the pending question as a conversation;
use the intent detector to add intents to the questions and answers;
input the conversation with intents into the answer prediction model;
use the answer prediction model to generate answer predictions for the pending question based on the question with intents and the conversation with intents;
wherein the processing device is further configured to:
operate an intent transition model;
use the intents from the conversation as a conversation intent journey;
input the conversation intent journey into the intent transition model;
use the intent transition model to generate desired answer intents from the conversation intent journey;
input the answer intents into the answer prediction model;
generate the answer predictions with the answer prediction model based on the desired answer intents;
perform a diverse beam search on the desired answer intents; and
use results of the diverse beam search in the answer prediction model to generate the answer predictions.

12. The processing system of claim 11, wherein the intents added to the questions are categories for phrases in the questions and the intents added to the answers are categories for phrases in the answers.

13. A processing system for operating a dialogue analyzer, the processing system comprising:
a processing device configured to:
operate an intent detector;
operate an answer prediction model;
capture a dialogue of user questions and agent answers to the user questions;
use the intent detector to identify question intents in the user questions and answer intents in the agent answers;
identify a pending question in the dialogue;
use the intent detector to add intents to the pending question;
input the pending question with intents into the answer prediction model;
identify a sequence of questions and answers prior to the pending question as a conversation;
use the intent detector to add intents to the questions and answers;
input the conversation with intents into the answer prediction model; and
use the answer prediction model to generate answer predictions for the pending question based on the question with intents and the conversation with intents,
wherein the processing device is further configured to:
operate an intent transition model;
use the intents from the conversation as a conversation intent journey;
input the conversation intent journey into the intent transition model;
use the intent transition model to generate desired answer intents from the conversation intent journey;
input the desired answer intents into the answer prediction model;
generate the answer predictions with the answer prediction model based on the desired answer intents;
wherein the processing device is further configured to:
store training data including dialogues of questions and answers;
identify intents in the questions and answers in the training data;
identify a pending question in the training data;
input the pending question with intents from the training data into a question encoder in the answer prediction model;
identify a conversation of questions and answers in the training data prior to the pending question;
input the questions with intents and answers with intents for the conversation from the training data into a conversation encoder in the answer prediction model;
identify an answer in the training data to the pending question; and
input the answer in the training data to the pending question with intents into a decoder in the answer prediction model.

14. The processing system of claim 13, wherein the processing device is further configured to:
increase weights for answers in the training data occurring with less frequency; and
decrease weights for answers in the training data occurring with more frequency.

15. The processing system of claim 13, wherein the intents added to the questions are categories for phrases in the questions and the intents added to the answers are categories for phrases in the answers.

* * * * *